United States Patent [19]
Brodell et al.

[11] Patent Number: 5,524,847
[45] Date of Patent: Jun. 11, 1996

[54] NACELLE AND MOUNTING ARRANGEMENT FOR AN AIRCRAFT ENGINE

[75] Inventors: Robert F. Brodell, Marlborough; Edward J. Hovan, Manchester, both of Conn.; Steven T. Selfors, Somerville, Mass.; Constantino V. Loffredo, Newington; Paul W. Duesler, Manchester, both of Conn.

[73] Assignee: United Technologies Corporation, East Hartford, Conn.

[21] Appl. No.: 117,464

[22] Filed: Sep. 7, 1993

[51] Int. Cl.⁶ .......................... F02C 7/20; B64D 27/18; B64D 27/26
[52] U.S. Cl. .......................... 244/54; 60/39.31; 248/554
[58] Field of Search ................. 244/54, 53 R; 60/39.31; 248/554, 555

[56] References Cited

U.S. PATENT DOCUMENTS

| | | | |
|---|---|---|---|
| 3,948,469 | 4/1976 | Brown | 244/54 |
| 4,013,246 | 3/1977 | Nightingale | 244/54 |
| 4,044,973 | 8/1977 | Moorehead | 244/54 |
| 4,055,041 | 10/1977 | Adamson et al. | 244/54 X |
| 4,266,741 | 5/1981 | Murphy | 244/54 |
| 4,326,682 | 4/1982 | Nightingale | 244/54 |
| 4,458,863 | 7/1984 | Smith | 244/54 |
| 4,634,081 | 1/1987 | Chee | 244/54 |
| 4,658,579 | 4/1987 | Bower et al. | 60/39.31 X |
| 4,815,680 | 3/1989 | Goldhammer | |
| 4,825,648 | 5/1989 | Adamson | 60/39.31 X |
| 5,174,525 | 12/1992 | Schilling | 248/554 X |
| 5,205,513 | 4/1993 | Schilling | 248/554 X |
| 5,277,382 | 1/1994 | Seelen et al. | 248/555 X |
| 5,319,922 | 6/1994 | Brantley | 60/39.31 |

FOREIGN PATENT DOCUMENTS

| | | |
|---|---|---|
| 2290350 | 6/1976 | France . |
| 2046193 | 11/1990 | United Kingdom . |

OTHER PUBLICATIONS

PCT/GB92/00994, Newton, Gas Turbine Engine Nacelle Assembly, International Publication No. WO 92/02920, International Publication Date 18 Feb. 1993.

Primary Examiner—William Grant
Attorney, Agent, or Firm—Kenneth C. Baran

[57] ABSTRACT

A nacelle and mounting arrangement for a high bypass ratio ducted fan aircraft engine mounted external to the aircraft main structure is disclosed. The nacelle and mounting arrangement isolate the engine from the adverse effects of certain aerodynamic forces acting on the nacelle by transferring substantially all of those forces directly from the nacelle to the aircraft and transferring substantially none of those forces to the engine. Various arrangements of the nacelle components which facilitate engine removal while avoiding the placement of nacelle component interfaces in highly stressed regions of the nacelle are also disclosed.

10 Claims, 5 Drawing Sheets fig. 1 fig. 2 fig.6 fig. 7 prior art

NACELLE AND MOUNTING ARRANGEMENT FOR AN AIRCRAFT ENGINE

TECHNICAL FIELD

This invention relates to aircraft propulsion systems and more particularly to a nacelle and mounting arrangement for aircraft engines.

BACKGROUND ART

Propulsion systems for powering modern commercial aircraft may include a high bypass ratio ducted fan engine, housed within an aerodynamically streamlined nacelle, and joined to the aircraft by an aerodynamically streamlined pylon.

The ducted fan engines used in these propulsion systems have a core section whose internal components include one or more axial flow compressors with radially extending blades rotatably driven about a longitudinal axis by one or more corresponding axial flow turbines also having radially extending blades. A core case, circular when viewed along the longitudinal axis, surrounds the compressors and turbines to form the outer flow path boundary of the core section and serve as a structural frame or backbone for the engine. Circumferentially extending blade tip seals are positioned on the inner surface of the core case radially outward of the rotating compressor and turbine blades and in close proximity thereto to ensure high efficiency.

A fan section, larger in diameter than the core section and concentric therewith, includes fan blades mounted in a hub, rotatable about the longitudinal axis and surrounded by a fan case which is circular when viewed along the longitudinal axis. A plurality of radial fan struts secures the fan case to the core case. A circumferentially extending fan tip seal is positioned on the inner surface of the fan case radially outward of the rotating fan blades and in close proximity thereto to ensure high efficiency.

The engine, as installed on an aircraft, is housed within a streamlined nacelle including an inlet, an intermediate fairing and an aft fairing. The inlet extends forward of the fan case and is firmly secured to a forward flange thereof. The intermediate fairing is a pair of access doors for maintenance access or engine removal, each door being hinged to a pylon forward extension as described more completely hereinafter. When the access doors are closed around the fan case, they latch together at their juncture so that each door encompasses approximately 180° of the fan case circumference. The aft fairing has an inner core cowl closely surrounding and substantially coextensive with the core section and an axially shorter fan duct outer wall concentric with the core cowl. The core cowl and fan duct outer wall define an annular, axially extending fan duct for conducting a fan flow stream in the axial direction. A fan duct discharge plane at the trailing edge of the fan duct defines the aft terminus of the fan duct.

A pylon, which includes an internal structural framework enclosed within an aerodynamically streamlined skin is secured to the aircraft, for example, to the lower side of an aircraft wing, and extends across the fan flow stream to mount the engine external to the main structure of the aircraft. Three sets of mount links extend between the pylon and the core case to connect the engine to the pylon. A forward link set carries vertical and lateral forces such as the engine's own weight and wind gusts acting on the core cowl. An aft link set located aft of the forward set accommodates vertical and lateral forces as well as torque reactions that accompany engine acceleration, deceleration or rotor seizure. An axial link set transmits axial forces, for example, engine thrust. All of the forces and torques acting on the nacelle or engine are carried through the mount links into the pylon structural framework to the aircraft. Accordingly, the pylon is a large, heavy component having substantial surface area exposed to the fan flow stream. A forward extension of the pylon extends axially forward beyond the interface between the intermediate fairing and the fan duct outer wall and includes the hinges for the intermediate fairing.

Among the forces imposed on the nacelle during aircraft operation is an aerodynamic force resulting from aircraft maneuvers hereinafter referred to as the nacelle aerodynamic force. The nacelle aerodynamic force is analogous to the lift force exerted on the aircraft wing and is especially sizeable during takeoff and other maneuvers involving high angles of attack or rates of change thereof. The nacelle aerodynamic force is distributed nonuniformly over the nacelle surface in both the axial and circumferential directions, but is predominant near the forward edge of the inlet at a circumferential location dependent upon aircraft orientation and wind gusts. The nacelle aerodynamic force is transmitted to the engine and is reacted at the mount links. At takeoff rotation, for example, the nacelle aerodynamic force may be directed vertically upward so that the forward mount links impose a downwardly directed reaction force on the core case while the aft mount links place an upwardly directed reaction force on the core case at a location aft of the forward links. Since the mount links restrain the engine, the associated reaction forces, acting in concert with the nacelle aerodynamic force, bend the core and fan cases relative to the longitudinal axis, an effect referred to as backbone bending. Some aircraft maneuvers may also superimpose inertial forces on the nacelle aerodynamic force with additive or offsetting effects.

The nacelle aerodynamic force also distorts the shape of the inlet, and hence the fan case, so that fan case circularity is disturbed, a condition commonly known as ovalization, although those skilled in the art understand that the distorted shape depends on the exact magnitude and distribution of the nacelle aerodynamic force.

Both ovalization and backbone bending can cause the cases to intrude on the essentially circular path followed by the fan, compressor and turbine blade tips. The resulting contact between the blade tips and the seals positioned on the inner surfaces of the cases erodes the seals with a concomitant and permanent loss of engine efficiency.

Ovalization and backbone bending can be accommodated with increased clearance between the rotating blade tips and the surrounding cases, however, this introduces an efficiency loss not unlike that associated with seal erosion.

In the current generation engines, ovalization and backbone bending are mitigated by the use of stronger, and hence heavier cases and fan struts than would be required if the nacelle aerodynamic force was not present. However, the use of heavier cases and struts to mitigate ovalization and backbone bending in future generation engines will impose a significant weight penalty. Future generation engines are likely to have a higher bypass ratio (the ratio of airflow passing through the fan section to that passing through the core section), and therefore, a higher ratio of fan section diameter to core section diameter, than present generation engines. Achieving higher bypass ratio by decreasing the core section diameter renders the core case inherently less capable of resisting backbone bending. Conversely, achieving high bypass ratios by increasing fan section diameter will dramatically increase the nacelle aerodynamic force which increases with the square of fan section diameter, thereby increasing backbone bending. Thus, either method of increasing bypass ratio beyond that of present generation commercial engines (approximately five) will exacerbate backbone bending and fan case ovalization so much that mitigation of these effects by case and strut strengthening will impose an undesirable and possibly prohibitive weight increase.

Another detrimental aspect of conventional mounting arrangements is the drag created by the pylon in the fan flow stream, and particularly, in that portion of the fan flow stream downstream of the fan duct discharge plane. The fan flow is subsonic upstream of the fan duct discharge plane and supersonic downstream thereof. The drag associated with supersonic flow significantly exceeds that associated with subsonic flow for a given pylon surface area. In conventional mounting arrangements, the pylon has a large surface area, most of which is downstream of the fan duct discharge plane where its exposure to supersonic flow creates significant drag that detracts from aircraft operating efficiency.

In view of these shortcomings, an aircraft engine nacelle and mounting arrangement that isolates the engine from ovalization and backbone bending, contributes to engine efficiency retention, and minimizes engine weight and pylon drag is sought.

DISCLOSURE OF THE INVENTION

According to one aspect of the present invention the adverse effects of backbone bending and ovalization are significantly reduced by a unique nacelle and mounting arrangement that substantially isolates the engine from the nacelle aerodynamic force by transmitting that force directly from the nacelle to the aircraft.

At least a portion of the nacelle is united with an aircraft mounted pylon beam so that the load path for transmitting the nacelle aerodynamic force to the aircraft bypasses the engine and transfers the force directly from the nacelle to the pylon beam and the aircraft. A streamlined subpylon extends across the fan flow stream to transmit most other forces, for example engine weight and thrust, from the engine to the pylon beam. In one arrangement, the nacelle and pylon beam are individual components united by a separable joint located outside the region of juncture of the pylon beam and the subpylon. Because of the separable joint, the nacelle and pylon beam can be manufactured independently if it is desirable to do so. In addition, one or more partitioning joints may be located along the length of the pylon beam if desired. Because the engine is supported from the pylon beam by the subpylon, the partitioning joint can be used to detach the engine and nacelle from the aircraft as a complete unit. In another embodiment, the nacelle and pylon beam are united by being manufactured as a one piece integral unit or manufactured to act as a one piece integral unit.

According to another aspect of the invention, drag is reduced by locating the pylon beam radially outward of the fan flow stream and minimizing the surface area of the subpylon exposed to the supersonic flow downstream of the fan duct discharge plane. A significant contribution to the reduction of the subpylon size is made possible by reacting engine torque at a location forward of the conventional torque reaction location.

In one detailed arrangement of the nacelle components for suspending an engine under an aircraft wing, the nacelle includes an inlet, an intermediate cowl, a fan duct outer wall and a core cowl. The intermediate cowl is axially split into upper and lower segments to facilitate engine removal. The lower segment can be an essentially 180° segment removably secured to the upper segment, or can be a pair of subsegments hinged to the upper segment. In an alternative arrangement, the nacelle includes upper and lower fan cowls, a fan duct outer wall and a core cowl. The upper and lower fan cowls are each an essentially 180° segment.

The primary advantages of the invention are the engine efficiency retention and weight savings which result from isolating the engine from the adverse effects of fan case ovalization and backbone bending rather than mitigating those effects by strengthening the cases and fan struts.

Another advantage is the drag reduction resulting from locating the pylon beam radially outward of the fan flow stream and placing the torque reaction mount links at a location that contributes to minimizing the surface area of the subpylon skin exposed to supersonic flow.

Another advantage of the present invention is the unique arrangement of nacelle components that facilitates convenient removal and replacement of the engine without subjecting nacelle component interfaces to high stresses.

The foregoing features and advantages of the present invention will become more apparent in light of the following detailed description of the best mode for carrying out the invention and the accompanying drawings.

BEST MODE FOR CARRYING OUT THE INVENTION

Figure 1:
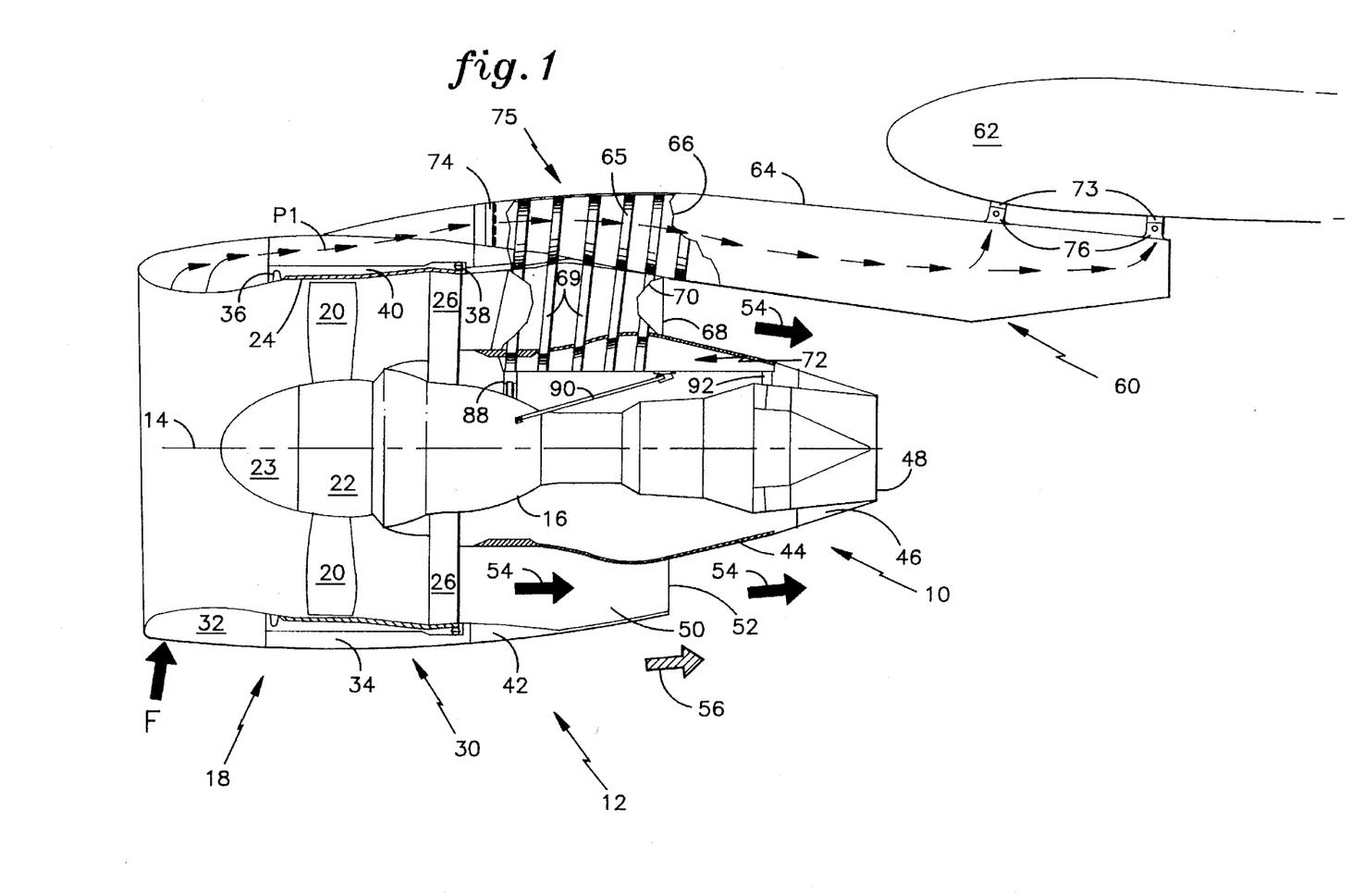
FIG. 1 is a cross sectional elevation of the nacelle and mounting arrangement of the present invention as applied to a high bypass ratio ducted fan engine suspended under the wing of an aircraft.
Figure 2:
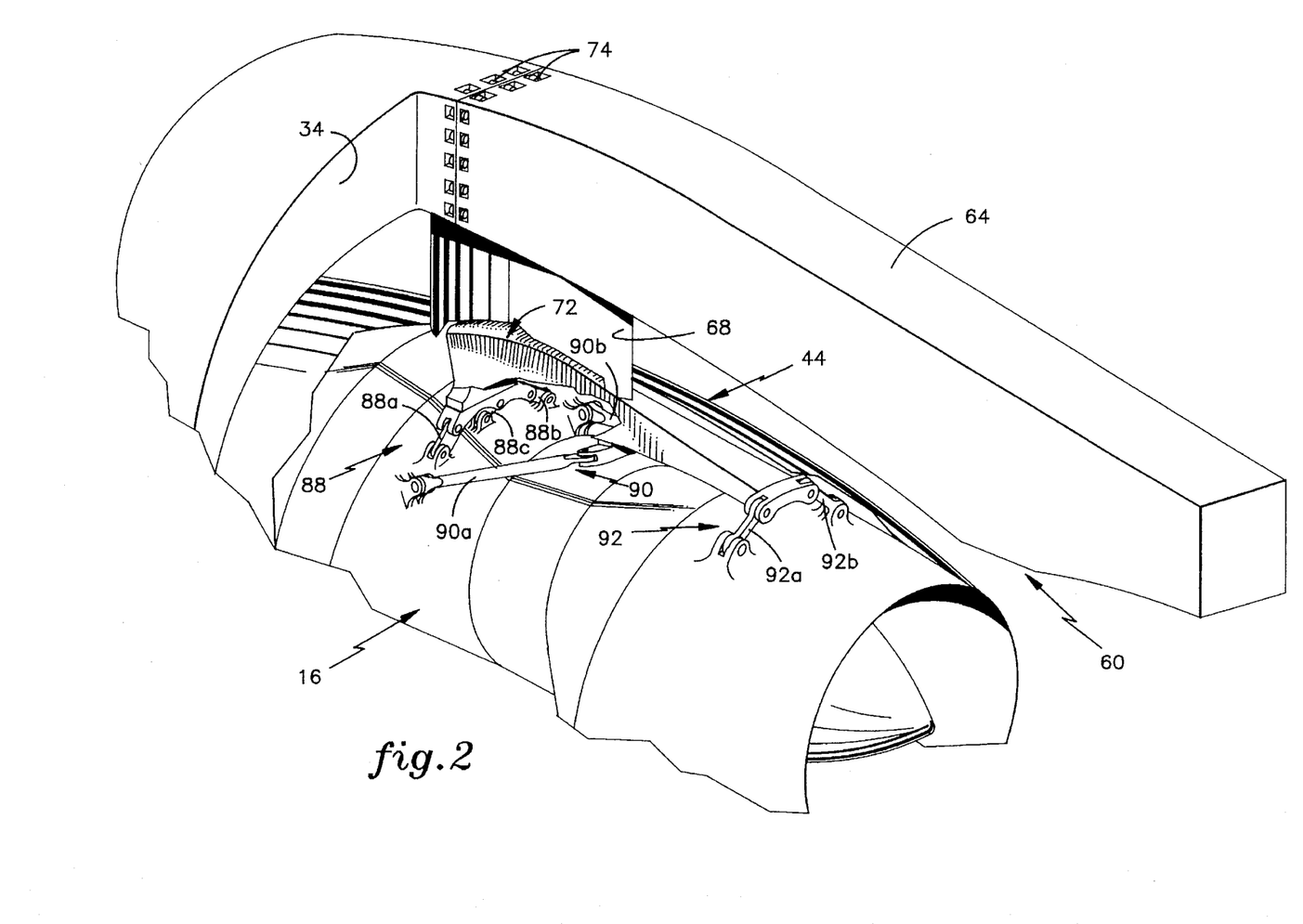
FIG. 2 is a fragmentary perspective view of the nacelle and mounting arrangement of the present invention showing additional details.

Referring to FIGS. 1 and 2, a high bypass ratio ducted fan aircraft engine 10 includes a core section 12 whose internal components (not shown) include one or more bladed axial flow compressors, driven by corresponding bladed axial flow turbines rotating about a longitudinal axis 14. A core case 16, essentially circular in cross section when viewed along the axis at any axial location, forms the outer flow path boundary of the core section and serves as a structural frame or backbone of the engine. Circumferentially extending blade tip seals (not shown) are positioned on the inner surface of the core case radially outward of the rotating compressor and turbine blades and in close proximity thereto to ensure high engine efficiency.

A fan section 18, larger in diameter than the core section and concentric therewith, includes fan blades 20 mounted in a hub 22 whose forward facing surface is covered by a streamlined nose dome 23. The hub and fan blades are rotatable about the longitudinal axis and are surrounded by a fan case 24 which forms the outer flow path boundary of the fan section. The fan case is essentially circular in cross section when viewed along the engine axis at any axial location. A plurality of radially extending fan struts 26 secure the fan case to the core case. Circumferentially extending blade tip seals (not shown) are positioned on the inner surface of the fan case radially outward of the rotating compressor and turbine blades and in close proximity thereto to ensure high engine efficiency.

The engine, as installed on an aircraft, is housed within an aerodynamically streamlined nacelle 30. The nacelle includes an inlet 32 forward of the fan case, secured to an intermediate cowl 34 which surrounds and is substantially coextensive with the fan case 24. Circumferentially extending flexible seals, such as an arching band 36 and elastomeric ring 38, span between and cooperate with the fan case and the intermediate cowl to define an annular cavity 40 which accommodates deflection of the nacelle relative to the fan case. The nacelle also includes a fan duct outer wall 42 aft of the intermediate cowl and secured thereto, and a core cowl 44 enclosing the core section. A core exhaust nozzle 46 extends axially from the core case and ends at a core discharge plane 48. The fan duct outer wall and the core cowl cooperate to define an axially extending annular fan duct 50 terminating at a fan duct discharge plane 52 upstream of the core discharge plane 48. A fan flow stream 54 is conducted axially through the fan duct and is discharged at the fan duct discharge plane, downstream of which it may be redirected by free stream flow 56 so that the fan flow stream proceeds with a slight radially inward velocity component as well as an axial component.

The engine is mounted on the aircraft, external to the main aircraft structure, by a pylon 60 extending between the engine and, for example, an aircraft wing 62. The pylon includes a pylon beam 64 with an internal structural framework 65 enclosed within a skin 66, a subpylon 68 also having an internal framework 69 enclosed within a skin 70, and an engine mount beam 72. Wing mount fittings 73 on the aircraft wing and pylon-to-aircraft mount fittings 76 on the pylon beam are used to secure the pylon to the wing. The pylon beam portion of the pylon is united with the intermediate cowl 34 by a separable joint such as the bolted joint 74 located longitudinally outside the region of juncture 75 of the subpylon with the pylon beam. In addition, one or more additional separable partitioning joints may be located along the pylon beam outside the region of juncture with the subpylon for separating the pylon beam into distinct modules, for example, to establish an interface between hardware supplied by the engine manufacturer and the aircraft manufacturer. The pylon beam and the intermediate cowl can also be manufactured as a one piece integral unit or can be made of individual components united by essentially inseparable joints, for example, welded joints, to act as an integral unit.

The subpylon 68 extends from the pylon beam, across the fan flow stream 54 and terminates in the engine mount beam 72 radially inward of the core cowl 44. As shown best in FIG. 2, three sets of mount links 88, 90 and 92 extend between the engine mount beam and the engine case to mount the engine to the pylon and transmit forces from the engine to the pylon. Aft mount link set 92 includes two mount links 92a, 92b each of which transmits vertical and lateral forces, for example the engine's own weight and wind gusts acting on the core cowl. Forward mount link set 88 includes three links 88a, 88b, 88c, two of which (88a and 88b) are analogous to the two vertical and lateral force reacting links in set 92, and the third of which (88c) carries the torque reaction that accompanies acceleration, deceleration or seizure of the rotating compressors and turbines. An axial mount link set 90 includes two mount links 90a, 90b to transmit axial forces such as engine thrust. The links within sets 88 and 92 are capable of limited motion in a plane approximately perpendicular to the longitudinal axis 14 and the thrust links 90 are capable of limited motion in the lateral and vertical directions. The construction and configuration of the mount links are conventional, however, as explained in greater detail hereinafter, the placement of the torque reacting link set forward of the link set that reacts only vertical and lateral forces is a feature of the present invention. Preferably, the engine's center of gravity, the forward mount link set, and at least a portion of the subpylon structural framework are approximately axially coincident. The axial coincidence ensures a generally linear load path from the engine case to the pylon beam which minimizes bending stresses on the subpylon and engine mount beam.

Figure 3:
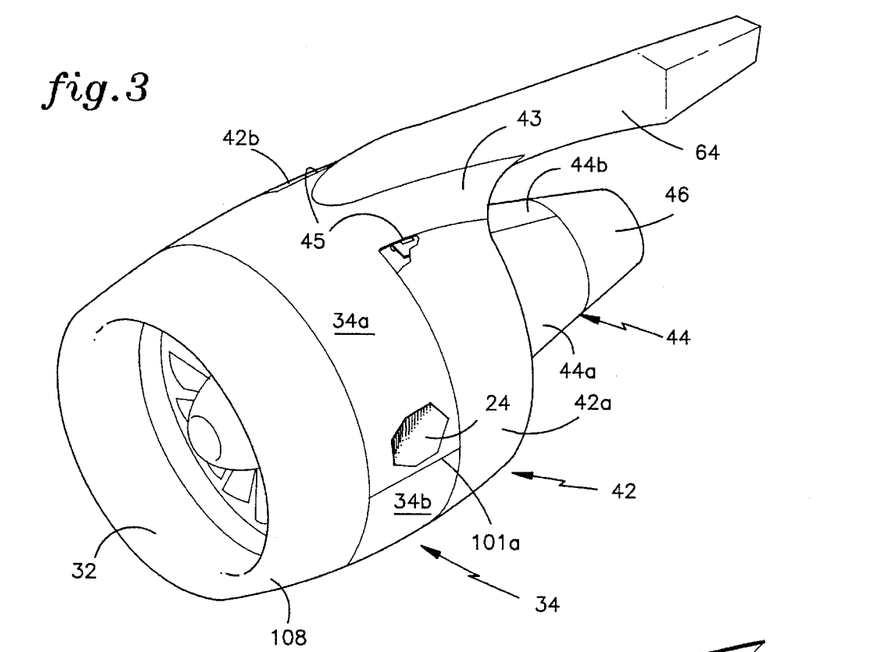
FIG. 3 is a perspective view showing one arrangement of the nacelle components of the present invention.
Figure 4:
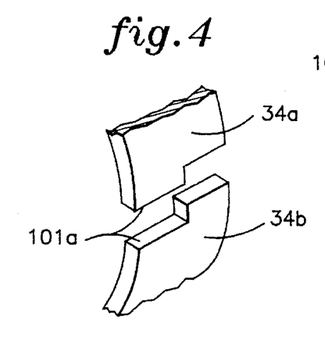
FIG. 4 is a fragmentary perspective view illustrating an alternative interface between the lower and upper intermediate cowl segments of FIG. 3.
Figure 5:
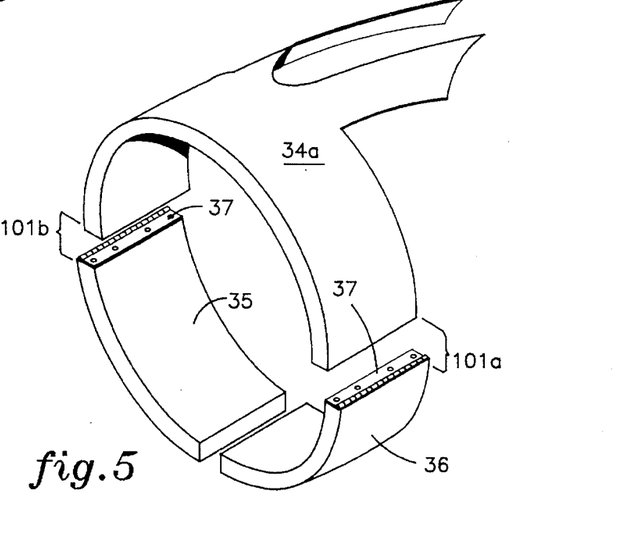
FIG. 5 is a perspective view of the upper and lower intermediate cowl segments of FIG. 3 illustrating an alternative arrangement of the lower intermediate cowl segment.

Further details of the arrangement of nacelle components are illustrated in FIGS. 3, 4 and 5. The exact means by which the various components are joined together (e.g., bolts or hinges) are typically not visible and are not embraced by the present invention and, therefore, are not depicted in the Figures. The intermediate cowl 34, which completely surrounds the circumference of the fan case, includes upper and lower intermediate cowl segments 34a and 34b, each segment extending over approximately 180° of the fan case circumference and separably joined by bolts and nuts along essentially axial interfaces 101a, 101b. The nacelle also includes the circumferentially continuous inlet 32 forward of the intermediate cowl. The inlet is secured to the upper intermediate cowl segment by mechanical fasteners such as nuts and bolts and has a circumferentially extending groove that mates with a corresponding knife edge on the lower intermediate cowl segment to secure the lower portion of the inlet to the lower intermediate cowl segment. The fan duct outer wall 42 includes both left and right outer walls 42a, 42b each of which is secured by a hinged joint 45 to a corresponding hinge beam portion 43 of the upper intermediate cowl segment. The core cowl 44, comprises left and right core cowls 44a, 44b each of which is connected to the engine mount beam by hinges internal to the core cowl. The core exhaust nozzle 46 is bolted to a flange on the core case.

As shown in FIG. 4, and as discussed in more detail hereinafter, the upper and lower intermediate cowl segments may extend slightly more or less than 180° over at least a portion of their axial length if necessary to accommodate engine removal and subsequent transport in the longitudinal direction, provided that the assembled segments completely circumscribe the fan case. As shown in FIG. 5, the lower intermediate cowl segment 34b may comprise subsegments 35, 36 joined by hinges 37 to the upper segment along the interfaces 101a, 101b and which, when closed, latch together to enclose the fan case.

Figure 6:
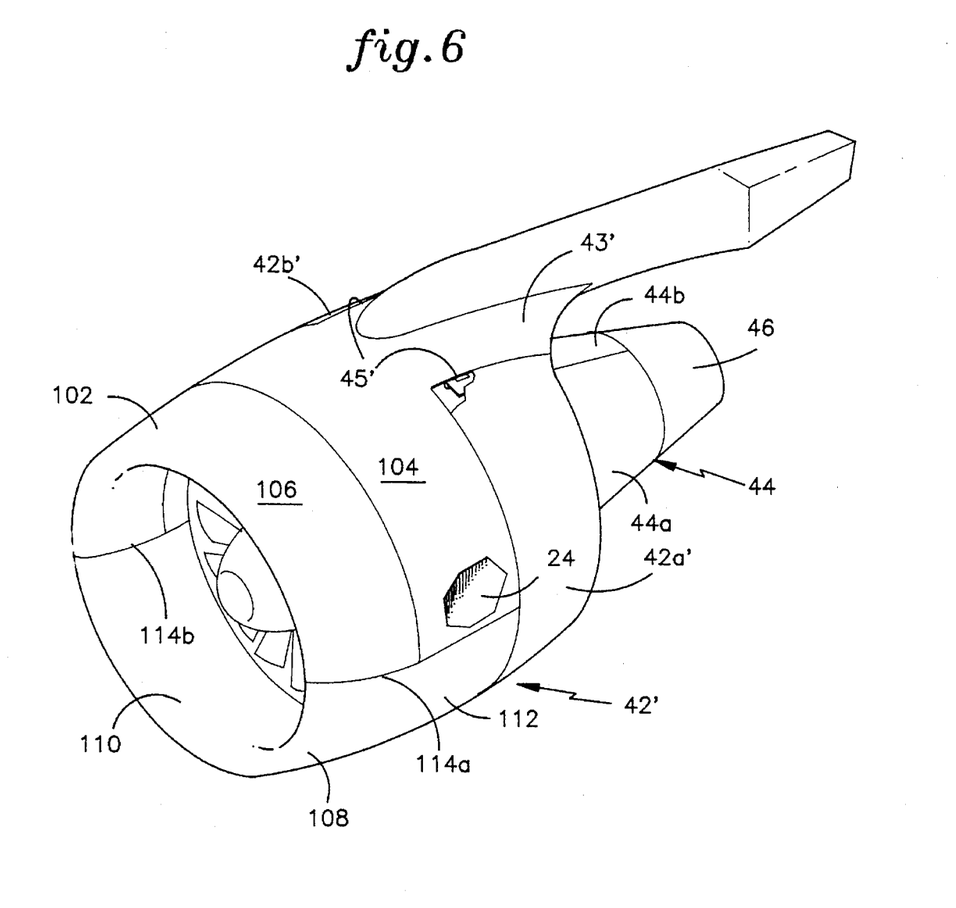
FIG. 6 is a perspective view showing an alternative arrangement of the nacelle components of the present invention.

An alternative nacelle component arrangement is shown in FIG. 6. The nacelle includes an upper fan cowl 102 having an upper fan case cowl 104 substantially coextensive with the fan case 24 and extending circumferentially approximately 180°. The upper fan cowl also includes an inlet segment 106 forward of and circumferentially coextensive with the upper fan case cowl and secured thereto by mechanical fasteners such as bolts and nuts. The nacelle also includes a lower fan cowl 108 having an inlet portion 110 integral with a lower fan case cowl portion 112. The lower fan cowl 108 is separably joined with bolts and nuts to the upper fan cowl 102 along essentially axial interfaces 114a, 114b. The fan duct outer wall 42' includes both left and right outer walls 42a', 42b' each of which is secured by a hinged joint 45' to a corresponding hinge beam portion 43' of the upper fan case cowl 104. The core cowl 44, comprises left and right core cowls 44a, 44b each of which is connected to the engine mount beam by hinges internal to the core cowl. The core exhaust nozzle 46 is bolted to a flange on the core case.

The nacelle of the present invention is used with engines mounted external to the main structure of the aircraft. Examples of externally mounted engines include those suspended under an aircraft wing or cantilevered laterally from the fuselage. By contrast, internally mounted engines are exemplified by those located within the fuselage structure, as is common in military fighter aircraft, or mounted within the tail structure of some commercial airliners.

During aircraft maneuvers the nacelle may experience a nacelle aerodynamic force distributed nonuniformly over the nacelle surface both axially and circumferentially. Because the nacelle of an externally mounted engine is not directly supported by the aircraft structure, which would be capable of absorbing forces acting on the nacelle, the nacelle aerodynamic force can significantly deflect and distort the nacelle. For example, referring again to FIG. 1, the nacelle may experience an essentially upwardly directed nacelle aerodynamic force F during takeoff. The nacelle may deflect and ovalize so that over a portion of its circumference, the nacelle deflects radially inward, however, cavity 40 precludes contact and, therefore, force transmittal between the nacelle and the fan case. The flexible seals 36, 38 deflect to accommodate the deflection of the nacelle relative to the fan case without conveying any significant force into the fan case. Instead, the force is transmitted around the circumference of the nacelle and then directly from the nacelle to the pylon beam and the aircraft along load path P1, effectively isolating the engine from the case ovalizing and backbone bending influences of force F. Forces other than the nacelle aerodynamic force, such as engine weight, engine thrust and lateral wind gusts, that do not contribute to ovalization and backbone bending are transmitted through the mount links sets 88, 90, 92 to the engine beam, subpylon and pylon beam.

Figure 7:
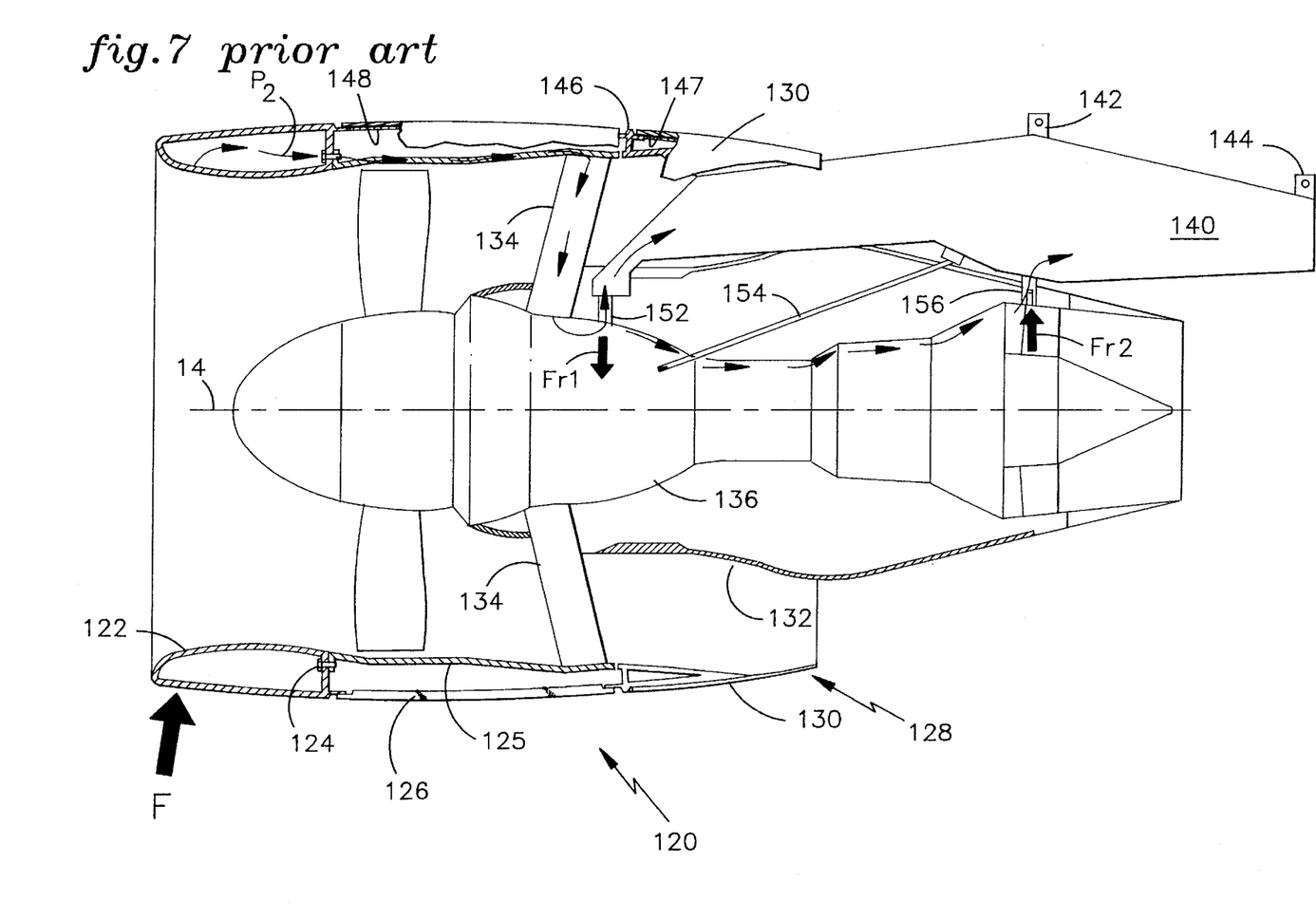
FIG. 7 is a cross sectional elevation of a prior art nacelle and mounting arrangement for a high bypass ratio ducted fan engine.

The above described operation is better appreciated when contrasted with that of a conventional nacelle and mounting system shown in FIG. 7. In the conventional arrangement, a nacelle 120 includes an inlet 122 firmly secured, as by a bolted joint 124 to the fan case 125, an intermediate fairing 126 which is a pair of essentially 180° access doors connected by hinges 148 to a forward extension 146 of the pylon 140, and an aft fairing 128 including two essentially 180° fan duct outer walls 130, each connected by hinges 147 to the pylon forward beam extension 146, and an inner core cowl 132. A plurality of fan struts, as represented by struts 134, extend generally radially to connect the fan case 125 to the core case 136. Three sets of mount links 152, 154, 156 connect the engine to the pylon 140 which itself is attached to the aircraft at pylon-to-aircraft mount fittings 142, 144. Forward mount link set 152 is a set of two links that transmit vertical and lateral forces, axial mount link set 154 is a set of two links that transmit axial forces, and aft mount link set 156 is a set of three links located aft of the forward link set to transmit vertical forces, lateral forces and torque.

The nacelle aerodynamic force F ovalizes the inlet 122 and, due to the rigid joint 124 between the inlet and the fan case 125, ovalizes the fan case as well, causing the fan case to contact the fan blade tip, thereby eroding the blade tip seals (not shown) on the inner surface of the fan case radially outward of the blade tips. The force F is also transmitted around the circumference of the nacelle and along load path P2, illustrated by broken lines, from the inlet to the fan case and then through the fan struts to the core case where it is reacted at the forward and aft mount link sets. The reaction forces Fr1 and Fr2 exerted by the mount links on the engine case act in concert with force F to bend the cases and cause the adverse effects previously described. Furthermore, because all of the forces and torques acting on the engine or nacelle are transferred to the pylon, the pylon is a relatively large component having substantial surface area exposed to the supersonic fan flow stream downstream of the fan duct discharge plane. Consequently, the pylon creates significant drag which degrades the aerodynamic efficiency of the aircraft.

Referring again to FIGS. 1 and 2, further features and advantages of the preferred embodiment can now be appreciated in light of the foregoing discussion. The pylon beam 64 of the present invention must withstand all of the forces and torques acting on the engine. However, the nacelle aerodynamic force F is conveyed directly to the pylon beam from the nacelle, thereby bypassing the engine cases so that the large, bulky pylon beam need not extend across the fan flow stream 54. Instead, the pylon beam is located radially outward of the fan flow stream and only the subpylon 68, which does not transmit nacelle aerodynamic forces and, therefore, is smaller than the pylon of conventional mount systems, extends across the fan flow stream. Thus, the direct transfer of nacelle aerodynamic forces from the nacelle to the pylon beam contributes to drag reduction by minimizing the surface area of components exposed to the fan flow stream, and particularly to the supersonic flow downstream of the fan duct discharge plane.

Minimization of the subpylon size is facilitated in the preferred embodiment by locating the torque reacting link set 88 forward of the link set 92 that reacts only vertical and lateral forces. Regardless of where the torque reacting link set is located, the torque reaction must be conveyed to the pylon beam through the subpylon. If torque were reacted at the aft link set (as is conventional) a structural framework corresponding to the subpylon would have to cross the fan flow stream downstream of the fan duct discharge plane to transmit the torque reaction vertically to the pylon beam. A streamlined skin, or an extension of the subpylon skin 70 would have to enclose the structural framework, creating additional drag and possibly negating the drag reduction benefit obtained by locating the pylon beam radially outward of the fan flow stream. Another way to transfer torque from the aft link set to the pylon beam would be to transfer it forward through the engine mount beam 72 and then through the subpylon structural framework 69. While this latter approach would possibly reduce the subpylon size, it would also require additional engine mount beam weight to accept the torque reaction along the beam's entire axial length. By reacting torque at the forward link set, the invention in its preferred embodiment takes advantage of the most practical positioning of the subpylon (approximately axially coincident with the engine center of gravity and the forward mount link set) to minimize the subpylon surface area exposed to the fan flow stream without increasing engine mount beam weight. Most preferably, the subpylon is small enough to be positioned entirely within the fan duct 50 where it is exposed only to subsonic flow, and the engine mount beam is located inboard of the core cowl 44 where it too is isolated from the fan flow stream.

Another feature of the present invention is the placement of nacelle component interfaces at a circumferential location that facilitates convenient engine removal while minimizing stress on the interfaces. Referring to FIG. 3, the upper and lower intermediate cowl segments 34a, 34b are approximately 180° sectors so that the interfaces therebetween, 101a and 101b (visible in FIG. 5), are each offset approximately 90° from the top of the engine. Aerodynamic forces acting on the lower intermediate cowl segment 34b are transmitted around the circumference of the intermediate cowl 34 and impose stress on the axially extending interfaces. The stress increases as the circumferential distance from the point of force application (near the bottom of the intermediate cowl) increases and, for this reason, it is desirable to locate the interfaces as close to the bottom of the intermediate cowl as possible. It is also necessary that an approximately 180° sector be made available for engine removal when the lower intermediate cowl segment is detached from the upper segment. Because the upper and lower intermediate cowl segments of the present invention are each approximately 180°, both the requirement for engine removal and the requirement for minimizing stress on the axially extending interfaces are satisfied. Likewise, the 180° extent of the upper fan cowl 102, and lower fan cowl 108 of the alternative arrangement (FIG. 6) provides the same benefits.

Engine removal is accomplished by separating the lower intermediate cowl segment 34b from the upper intermediate cowl segment 34a and inlet 32, opening or removing the fan duct outer wall 42 and the core cowl 44, removing the nose dome 23 (FIG. 1), and disconnecting the mount links. Removal of the lower intermediate cowl segment opens an approximately 180° sector through which the engine is removed. Depending on the amount of radial clearance between the inner surface of the nacelle and the engine cases (or components mounted thereon) a sector slightly less or more than 180° may suffice. Because the inlet 32 extends 360°, a wing mounted engine, once lowered from the aircraft, must be transported rearward. As shown in FIG. 4, slight deviations in sector circumferential extent can be incorporated along at least a portion of the axial length of the sectors if desirable. For aircraft where transport to the rear is blocked by components or structure protruding from the aircraft, the alternative arrangement of FIG. 6 can be used. This alternative arrangement, like that of FIG. 3, isolates the engine from the nacelle aerodynamic force, provides an approximately 180° nacelle sector which can be opened for engine removal, and places the interface between the upper fan cowl 102 and the lower fan cowl 108 in a lightly stressed region of the nacelle. Engine removal is accomplished by detaching the lower fan cowl 108 from the upper fan cowl 102 and proceeding as described above. Once lowered, the engine can be transported forward.

The nacelle and mounting arrangement of the present invention has been described as particularly applicable to ducted fan engines having a bypass ratio greater than 5, and the best mode for carrying out the invention was illustrated in the context of an engine suspended under an aircraft wing. However, the invention is also applicable to engines having a bypass ratio of 5 or less, as well as those mounted in other orientations and from other locations outside the main structure of the aircraft.

We claim:

1. For an aircraft ducted fan engine with a core section bounded by a core case and enclosed within a core cowl, a fan section of larger diameter than said core section secured to and concentric with said core section and bounded by a fan case having a fan duct outer wall downstream thereof, said fan duct outer wall and said core cowl defining an axially extending fan duct terminating at a fan duct discharge plane for conducting a fan flow stream essentially axially, a nacelle and mounting arrangement for mounting said engine on an aircraft, with said aircraft being comprised of a main structure, said nacelle and mounting arrangement comprising:

a pylon secured to said aircraft external to the main structure of said aircraft and adapted for said engine to be secured thereto, said pylon including a pylon beam located radially outward of said fan flow stream and secured to said aircraft and a subpylon extending from said pylon beam across said fan flow stream and terminating in an engine mount beam radially inward of said core cowl, a substantial portion of said subpylon being located within said fan duct forward of said fan duct discharge plane, said nacelle being united with said pylon to define a load path exclusive of said fan case and said core case such that when said nacelle is subjected to a nacelle aerodynamic force substantially all of said nacelle aerodynamic force is transmitted from said nacelle directly to said pylon beam rather than from said nacelle to said pylon beam by way of said fan case, said core case and said subpylon, said pylon beam also transmitting forces and torque acting on said engine to said aircraft and said subpylon being isolated from said nacelle aerodynamic force and transmitting only forces and torque acting on said engine to said pylon beam.

2. The nacelle and mounting arrangement of claim 1 further comprising a pair of circumferentially extending flexible seals spanning between said nacelle and said fan case for accommodating deflection of said nacelle relative to said fan case without conveying a significant portion of said nacelle aerodynamic force into said fan case.

3. The nacelle and mounting arrangement of claim 1, said engine mount beam being connected to at least an aft link set which transmits only vertical and lateral forces from said engine to said engine mount beam and a forward link set which transmits vertical forces, lateral forces and torque reactions from said engine to said mount beam.

4. The nacelle and mounting arrangement of claim 3 wherein said substantial portion of said subpylon is the entirety of said subpylon.

5. The nacelle and mounting arrangement of claim 3 wherein said pylon beam and said nacelle are united by a separable joint longitudinally outside the region of juncture of said pylon beam and said subpylon.

6. The nacelle and mounting arrangement of claim 3 wherein said pylon beam and said nacelle are integral.

7. The nacelle and mounting arrangement of claim 3 wherein said pylon beam comprises at least two modules separably Joined together at a partitioning joint outside the region of juncture of said pylon beam and said subpylon.

8. The nacelle and mounting arrangement of claim 1, said nacelle comprising:

an intermediate cowl comprising upper and lower intermediate cowl segments each segment extending circumferentially approximately 180° around said fan case and separably joined along an essentially axial interface, said upper intermediate cowl segment being united with said pylon radially outward of said fan flow stream; and a circumferentially continuous inlet forward of and secured to said intermediate cowl.

9. The nacelle and mounting arrangement of claim 8 wherein said lower intermediate cowl segment comprises two subsegments each hinged to said upper intermediate cowl segment.

10. The nacelle and mounting arrangement of claim 1, said nacelle comprising:

an upper fan cowl comprising an upper fan case cowl substantially coextensive with said fan case and extending circumferentially approximately 180° and an inlet segment forward of and secured to said upper fan case cowl and circumferentially coextensive therewith, said upper fan case cowl being united with said pylon radially outward of said fan flow stream; and a lower fan cowl extending approximately 180° having an inlet portion and a lower fan case cowl portion integral with said inlet portion, said upper fan cowl and said lower fan cowl separably joined along an essentially axial interface.

* * * * *